(12) United States Patent
Stucchi et al.

(10) Patent No.: US 8,997,703 B2
(45) Date of Patent: Apr. 7, 2015

(54) INTERNAL COMBUSTION ENGINE, WITH A SYSTEM FOR VARIABLE ACTUATION OF THE INTAKE VALVES PROVIDED WITH IMPROVED SOLENOID VALVES, AND SOLENOID VALVE FOR THIS ENGINE

(75) Inventors: Sergio Stucchi, Orbassano (IT); Onofrio De Michele, Orbassano (IT); Raffaele Ricco, Orbassano (IT); Marcello Gargano, Orbassano (IT)

(73) Assignee: C.R.F. Società Consortile per Azioni, Orbassano (Turin) (IT)

( * ) Notice: Subject to any disclaimer, the term of this patent is extended or adjusted under 35 U.S.C. 154(b) by 483 days.

(21) Appl. No.: 13/304,009

(22) Filed: Nov. 23, 2011

(65) Prior Publication Data

US 2012/0260871 A1 Oct. 18, 2012

(30) Foreign Application Priority Data

Apr. 14, 2011 (EP) .................................... 11162362

(51) Int. Cl.
*F01L 9/02* (2006.01)
*F01L 1/344* (2006.01)
*F16K 31/06* (2006.01)

(52) U.S. Cl.
CPC .......... *F01L 9/023* (2013.01); *F01L 2001/3443* (2013.01); *F16K 31/0655* (2013.01); *F01L 9/025* (2013.01)

(58) Field of Classification Search
CPC . F01L 9/023; F01L 9/025; F01L 2001/34433; F01L 2001/3443; F01L 2001/34426; F01L 9/02; F16K 31/0655
See application file for complete search history.

(56) References Cited

U.S. PATENT DOCUMENTS 6,227,154 B1 5/2001 Wakeman
2009/0020715 A1* 1/2009 Vattaneo et al. ......... 251/129.02

FOREIGN PATENT DOCUMENTS

| EP | 0803642 A1 | 10/1997 |
| EP | 1321634 A2 | 6/2003 |
| EP | 1726790 A1 | 11/2006 |

(Continued)

OTHER PUBLICATIONS

Oct. 10, 2011 European Search Report in related Application No. 11162362.5.

*Primary Examiner* — Thomas Denion
*Assistant Examiner* — Daniel Berstein
(74) *Attorney, Agent, or Firm* — Heslin Rothenberg Farley & Mesiti P.C.; Victor A. Cardona

(57) ABSTRACT

An internal combustion engine for motor-vehicles, includes a system for variable actuation of the intake valves of the engine having a solenoid valve controllable between a closed condition and an open condition wherein it places a pressurized fluid chamber in communication with an exhaust chamber, with the aim of decoupling the intake valve from the respective tappet and causing the quick closing of the intake valve due to the respective return spring. The solenoid valve has a valve element with a cylindrical body having a first conical surface portion and a second conical surface portion. The conical surface portions are defined by the axially opposite ends of a circumferential groove formed on the valve element. The first conical surface portion cooperates with the valve seat. The other conical surface portion has an outer diameter substantially identical to the diameter of the annular edge defining the valve seat.

14 Claims, 8 Drawing Sheets

(56) References Cited

FOREIGN PATENT DOCUMENTS

| | | |
|---|---|---|
| EP | 1936132 A1 | 6/2008 |
| EP | 2017439 A1 | 1/2009 |
| EP | 2108800 A1 | 10/2009 |
| GB | 2348245 A | 9/2000 |
| GB | 2348245 B | 9/2000 |
| WO | 03102383 A1 | 12/2003 |

* cited by examiner

INTERNAL COMBUSTION ENGINE, WITH A SYSTEM FOR VARIABLE ACTUATION OF THE INTAKE VALVES PROVIDED WITH IMPROVED SOLENOID VALVES, AND SOLENOID VALVE FOR THIS ENGINE

CROSS REFERENCE TO RELATED APPLICATIONS

This application claims priority to European Patent Application No. 11162362.5 filed Apr. 14, 2011, the entire disclosure of which is incorporated herein by reference.

FIELD OF THE INVENTION

The present invention refers to internal combustion engines of the type comprising,
a combustion chamber,
at least one intake conduit and at least one exhaust conduit ending up in said combustion chamber,
an intake valve and an exhaust valve associated to said intake and exhaust conduits and each provided with respective return springs which push the valve towards a closed position,
a camshaft for actuating the intake valves, through respective tappets,
wherein each intake valve is controlled by the respective tappet against the action of the respective return spring by hydraulic means including a pressurised fluid chamber on which there is faced a pumping piston connected to the tappet of the valve,
a solenoid valve controllable between a closed condition and an open condition wherein said solenoid valve places said pressurised fluid chamber in communication with an exhaust channel, with the aim of decoupling the intake valve from the respective tappet and causing the quick closing of the intake valve due to the respective return spring,
electronic control means, for controlling said solenoid valve to vary the opening instant and/or the closing instant and/or the lift of the intake valve as a function of one or more engine operative parameters,
wherein said solenoid valve comprises:
a valve body with a cylindrical inner cavity, at least one inlet opening communicating with said pressurised fluid chamber, formed radially through said body and ending up on said cylindrical cavity, and at least one outlet opening defined by an end of said cylindrical cavity which ends up on an end surface of the valve body,
a valve seat, formed on said valve body or on an annular element fixed in said valve body, said valve seat being defined by a concentric annular edge with said cylindrical cavity,
a valve element having a portion cooperating with said valve seat and a cylindrical body slidably mounted within said cylindrical cavity of the body of the valve between a first position wherein said portion is at contact with said valve seat, so as to prevent the communication between said inlet opening and said outlet opening, and a second position wherein said portion is spaced from said valve seat, so as to establish a communication between said inlet opening and said outlet opening,
spring means for returning the valve element towards one of said first and second position, and an electromagnet which can be activated to move the valve element towards the other position,
said electromagnet comprising a solenoid mounted on the body of the valve and a moveable anchor controlled by the solenoid and associated to the valve element,
wherein the body of the valve element has—on the outer surface thereof—a first and a second surface portion, substantially conical and with opposite conicities, both exposed to the pressure communicated by said inlet opening, whereby the valve element (105) is substantially balanced hydraulically.

An engine of this type is described in the document EP-A-2 017 439 of the Applicant.

PRIOR ART

Over the years, the Applicant has developed internal combustion engines comprising a system for the variable actuation of the intake valves of the engine, sold under the trademark "MULTIAIR". The Applicant owns various patents and patent applications regarding engines provided with a system of the type described above.

FIG. 1 of the attached drawings shows a cross-sectional view of an engine provided with the "MULTIAIR" system, as described in the European patent EP 0 803 642 B1 of the Applicant.

With reference to such FIG. 1, the engine illustrated therein is a multi-cylinder engine, for example an engine with four in-line cylinders, comprising a cylinder head 1. The head 1 comprises, for each cylinder, a cavity 2 formed by the base surface 3 of the head 1, defining the combustion chamber, in which the two intake conduits 4, 5 and two exhaust conduits 6 end up. The communication of the two intake conduits 4, 5 with the combustion chamber 2 is controlled by two intake valves 7, of the conventional mushroom type, each comprising a stem 8 slidably mounted in the body of the head 1.

Each valve 7 is returned towards the closed position by springs 9 interposed between an inner surface of the head 1 and an end retaining cap 10 of the valve. The communication of the two exhaust conduits 6 with the combustion chamber is controlled by two valves 70, also of the conventional type, to which springs 9 for return towards the closed position are associated.

The opening of each intake valve 7 is controlled, as described hereinafter, by a camshaft 11 rotatably mounted around an axis 12 within supports for the head 1, and comprising a plurality of cams 14 for the actuation of the intake valves 7.

Each cam 14 controlling an intake valve 7 cooperates with the plate 15 of a tappet 16 slidably mounted along an axis 17 which, in the case of the example illustrated in the mentioned prior art document, is substantially directed at 90° with respect to the axis of the valve 7. The plate 15 is returned against the cam 14 by a spring associated thereto. The tappet 16 constitutes a pumping piston slidably mounted within a bushing 18 carried by a body 19 of a preassembled assembly 20, incorporating all electrical and hydraulic devices associated to the actuation of the intake valves, according to the description outlined hereinafter.

The pumping piston 16 is capable of transmitting a thrust to the stem 8 of the valve 7, so as to cause the opening of the latter against the action of the elastic means 9, by means of pressurized fluid (preferably oil coming from the engine lubrication circuit) present in a pressure chamber C to which the pumping piston 16 is faced, and by means of a piston 21 slidably mounted in a cylindrical body constituted by a bushing 22 also carried by the body 19 of the sub-assembly 20.

Still in the solution described in FIG. 1, the pressurised fluid chamber C associated to each intake valve 7 can be placed in communication with an exhaust channel 23 through a solenoid valve 24. The solenoid valve 24, which can be of any known type adapted to the function illustrated herein, is controlled by electronic control means, indicated schematically with 25, as a function of signal S indicating the operating parameters of the engine, such as the position of the accelerator and the number of engine revolutions.

When the solenoid valve 24 is open, the chamber C enters in communication with the channel 23, hence the pressurised fluid present in the chamber C flows into such channel and thus obtaining the decoupling of the cam 14 and the decoupling of the respective tappet 16 from the intake valve 7, which thus quickly returns to the closing position thereof under the action of the return springs 9. Thus, controlling the communication between the chamber C and the exhaust channel 23, allows varying the opening time and the travel of each intake valve 7 at will.

The exhaust channels 23 of the various solenoid valves 24 end up in the same longitudinal channel 26 communicating with pressure accumulators 27, only one of which can be observed in FIG. 1.

All tappets 16 with the associated bushings 18, the pistons 21 with the associated bushings 22, the solenoid valves 24 and the respective channels 23, 26 are carried by and obtained from the abovementioned body 19 of the preassembled assembly 20, to the advantage of an engine that is quick and easy to assemble.

The exhaust valves 70 associated to each cylinder are controlled, in the embodiment illustrated in FIG. 1, conventionally, by a respective camshaft 28, through respective tappets 29, even though, in the case of the mentioned prior art document, an application of the hydraulic actuation system also controlling exhaust valves cannot be excluded generally.

Still with reference to FIG. 1, the variable volume chamber defined within the bushing 22 and facing the piston 21 (which is illustrated in the minimum volume condition thereof in FIG. 1, piston 21 being in the upper end stop position thereof) communicates with the pressurised fluid chamber C through an opening 30 obtained in an end wall of the bushing 22. Such opening 30 is engaged by an end nose 31 of the piston 21 so as to provide a hydraulic braking of the movement of the valve 7 in the closing phase, when the valve is close to the closing position, in that the oil present in the variable volume chamber is forced to flow into the pressurised fluid chamber C passing through the clearance present between the end nose 31 and the opening wall 30 engaged thereby. Besides the communication constituted by the opening 30, the pressurised fluid chamber C and the variable volume chamber of the piston 21 communicate with respect to each other through internal passages obtained in the body of the piston 21 and controlled by a check valve 32 which allows the passage of fluid only from the pressurized chamber C to the variable volume chamber of the piston 21.

During the normal operation of the known engine illustrated in FIG. 1, when the solenoid valve 24 excludes the communication of the pressurised fluid chamber C with the exhaust channel 23, the oil present in such chamber transmits the movement of the pumping piston 16, imparted by the cam 14, to the piston 21 which controls the opening of the valve 7. In the initial phase of the opening movement of the valve, the fluid coming from the chamber C reaches the variable volume chamber of the piston 21 passing through the check valve 32 and further passages which place the internal cavity of the piston 21, which is tubular-shaped, in communication with the variable volume chamber. After a first displacement of the piston 21, the nose 31 exits from the opening 30, hence the fluid coming from the chamber C may pass directly into the variable volume chamber through the opening 30, now free.

In the reverse movement for closing the valve, as previously mentioned, during the final phase, the nose 31 enters into the opening 30 causing the hydraulic braking of the valve, so as to avoid impacts of the body of the valve against the seat thereof, for example after an opening of the solenoid valve 24 which causes the immediate return of the valve 7 to the closed position.

In the described system, when the solenoid valve 24 is enabled, the valve of the engine follows the movement of the cam (full lift). An early closing of the valve can be obtained by disabling (opening) the solenoid valve 24, thus emptying the hydraulic chamber and obtain the closing of the valve of the engine under the action of the respective return springs. Analogously, a delayed opening of the valve can be obtained by delaying the opening of the solenoid valve, while the combination of a delayed opening with an early opening of the valve can be obtained by enabling and disabling the solenoid valve during the thrust of the relative cam. According to an alternative strategy, in compliance with the teachings of the patent application EP 1 726 790 A1 of the applicant, each intake valve can be controlled in "multi-lift" mode i.e. according to two or more repeated opening and closing "sub-cycles". In each sub-cycle, the intake valve opens and then closes completely. The electronic control unit is thus capable of obtaining a variation of the opening instant and/or the closing instant and/or of lift of the intake valve, as a function of one or more engine operative parameters. This allows obtaining the maximum efficiency of the engine, and lower consumption of fuel, under any condition of operation.

FIGS. 2, 3 of the attached drawings show an embodiment and a schematic simplification of a known solenoid valve (described in EP-A-2 017 439) used in the MULTIAIR system.

With reference to FIG. 2, the solenoid valve, indicated in its entirety with reference number 100, comprises a substantially tubular-shaped body 101 with four radial passages 102 (two of which are observable in the figure) ending up in the inner cavity 101a of the tubular body 101. A ring 103 defining—with an end edge thereof—a valve seat 104 for a valve element 105 intended to control the communication between the four passages 102 which in turn communicate with the inlet i (which in turn is in communication with the pressurised fluid chamber of the system for actuating the valve of the engine) and the outlet end 106 of the inner cavity of the body 101, constituting the outlet u communicating with the exhaust channel is mounted within such cavity. The valve element 105 has a tubular body which is normally maintained in a lifted end stop position (illustrated in FIG. 2), corresponding to the open condition between the inlet i and the outlet u, by a helical spring 107 interposed between the valve element 105 and a support disc 108 fixed to the body of the valve. In the abovementioned end stop lifted position, the valve element is in abutment against the end of a bushing 109 which is in turn locked in fixed position between a tubular body 110 fixed in the upper end of the cavity of the bushing 101. The tubular body 110, which contains part of the magnetic circuit, has a portion projecting axially from the tubular body 101 around which the solenoid 111 of the solenoid valve is mounted. The solenoid controls a movement of a moveable anchor 112 having a substantially cylindrical body with four axial grooves 112a (only two of which are shown in the drawing): the magnetic circuit is completed due to the magnetic core 120 (i.e. the metal body containing the solenoid 111) and the upper portion of the body 101. A thrust element 113 in form of a tubular rod which is provided by means of the tubular body 110 and by means of the bushing 109 and has an lower end which is usually kept at contact with the valve element 105 by a helical spring 114 which is axially interposed between the moveable anchor 112 and a cover 115 integral with the cap 118 (fixed to the tubular body 110) around which the coil is fitted 111 is connected to the moveable anchor 112. The previously described structure is exemplified in FIG. 3, which shows that the spring 107 normally keeps the valve open, pushing the valve element 105 to abut against the end of the bushing 109, in the end stop lifted position thereof, in which the valve element 105 is spaced from the valve seat 104 by a distance H. At the same time, the spring 114 normally keeps the moveable anchor 112 with the thrust element 113 associated thereto at the at the contact position of the thrust element 113 with the valve element 105. In such condition, as observable in FIG. 2, the moveable anchor 112 and the tubular body 110 have opposite ends slightly spaced from each other. An excitation of the solenoid 111 causes the lowering of the moveable anchor 112, against the action of the spring 107, up to the contact of the valve element 105 with the valve seat 104 and the ensuing closing of the communication between the inlet i and the outlet u. Such movement is allowed by the space present, in the rest condition, between the opposite surfaces of the moveable anchor 112 and the tubular body 110.

Still with reference to FIG. 2, a spring 116 is interposed between the ring 103 defining the valve seat, which is fixed to the tubular body 101, and a sealing ring 117, which is arranged around the valve element 105 and is held against the lower end surface of the tubular body 110, which is also fixed. Therefore, the spring 116, has no influence on the movement of the valve element 105 or of the moveable anchor 112.

FIG. 4 of the attached drawings shows a detail of a solenoid valve of the type illustrated in FIG. 2, as concretely provided. In such figure, in which the same reference numbers of FIG. 3 are used, the detail of the valve element 105 cooperating with the valve seat defined by the annular edge 104, coaxial with the cylindrical cavity 106, which is formed on the ring 103 fixed in the body 101 of the valve is illustrated. FIG. 4 also shows a specific embodiment of the sealing ring 117, made of plastic material, held in position against the end of the element 110 by the spring 116 and having an inner edge at sliding contact with the outer surface of the valve element 105.

The valve element 105 of FIG. 4 has an outer surface with a first conical portion C1, obtained at an end of the valve element 105, which cooperates with the valve seat 104, and a second conical portion C2, having opposite conicity with respect to the portion C1, which at the end thereof having smaller diameter is connected with the cylindrical surface of the upper part of the valve element 105, at sliding contact with the inner edge of the sealing ring 117. The conical portion C1 has an outer diameter greater than the diameter of the annular edge 104 constituting the valve seat, whose diameter is indicated with D2 in the detail of FIG. 4A. In FIG. 4A the diameter of the annular inner edge of the ring 117 at sliding contact with the cylindrical outer surface of the valve element 105 is indicated with D1.

In such known solution, ideally the two parameters D1, D2 should be substantially identical to each other. In such condition, the conical surfaces C1, C2, both exposed to the fluid pressure communicated by the inlet openings 102, allow the valve element 105 to be hydraulically balanced, i.e. solely subject to the forces generated by the solenoid 111 and by the springs 107 and 114. In other words, when the solenoid 111 controls the movement of the valve element 105 towards the closed position, it is solely required to overcome the force resulting from the springs 107 and 114 and the friction between the valve element 105 and the sealing ring 117 made of plastic material.

Technical Problem

In the previously described solenoid, the operation of the solenoid valve remains strictly constant during the entire operative life of the solenoid valve, substantially for the following reasons.

First and foremost, the sealing ring 117 made of plastic material leads to a friction force of unpredictable value and above all variable over the entire operative life of the solenoid valve, both due to the temperature variations of the fluid (which determines the elasticity of the sealing ring 117) and due to the wear the ring 117 is subjected to. A variation of such friction force is reflected in a different behaviour of the solenoid valve. In a system of the previously described type it is instead fundamental that the solenoid valve always preserves the same operative characteristics to ensure that the intake valves of the engine are always controlled in an accurate and predefined manner.

Another drawback related to the sealing obtained through the ring 117 made of plastic material consists in the variability of the leakages it is however subjected to. Such leakages strongly depend both on the temperature conditions of the fluid (and thus on the viscosity thereof), and on the wear conditions of the ring made of plastic material. Actually, during the operation the latter tends to stretch along the surface of the element 105 with the ensuing risk of breaking which could lead to a substantial and unpredictable increase of leakages, due to the high pressure operating against the ring 117.

Furthermore, the previously described structure and arrangement can lead, due to the design tolerance chain of various elements of the solenoid valve, to an imperfect coaxiality between the axis of the element 105 (and of the respective sealing surface C1) with the axis of the valve seat 104 obtained on the element 103: though possibly partly compensated by the radial clearance present between the element 105 and the respective guide 110, this non-coaxiality can lead to a condition of statical indeterminacy of the element 105, which hence can no longer perfectly couple with the valve seat 104 and thus jeopardizes the hydraulic sealing function of said coupling. This problem persists even though the surface C1 is made having the spherical cap shape. Though expensive, this solution allows partial self-centring of the surface C1 with respect to the seat 104, which is however not sufficient to overcome the problem if the divergence between the axis of the element 105 and the axis of the element 103 exceeds a given value.

Still, the principle of operation of the valve provides for that the total axial the pressure exerted by the fluid on the element 105 be substantially null (balanced valve element): in particular this condition occurs in case coincidence between the diameter values D1 and D2, indicated in FIG. 4A.

Let us consider the valve element 105 in the closing position (corresponding to solenoid enabled): in order to maintain the valve element 105 in this position, the electromagnet should overcome the force exerted by the spring 107 and the total of the pressure forces on the surface defined between the diameters D2 and D1, which is subjected to the fluid pressure communicated by the inlet openings 102. As clear, if the diameter D2 is greater than the diameter D1 the total pressure counters the spring 107 and thus the action of the electromagnet is facilitated; however, this will lead to an opening delay of the valve when the solenoid is de-excited (as an extreme case, if D2 is much greater than D1 even after de-exciting the solenoid the sealing element 105 is no longer lifted and the flow remains intercepted). On the contrary, if the diameter D2 is smaller than the diameter D1 the total pressure corresponds with the action of the spring 107 and thus the action of the electromagnet is countered more; in this case, there will be an early opening of the valve when the solenoid is de-excited, but as an extreme case, if D2 is much smaller than D1 the force of the electromagnet may not be sufficient to position the valve element 105 in closing position.

During the life of the valve, due to the inevitable wear of the surface 104, the diameter D2 tends to increase and this can lead to the previously described problem. In the case of the known solution illustrated in FIG. 2, this problem is addressed by providing the element 103 made of particularly hard material. However, the assembly and inspection of said ring can be disadvantageous and the positioning thereof by force-fitting could maybe lead to a deformation of the surface 104 which is however provided before the positioning of the ring 103 within the valve body 101.

Lastly, in order to reduce the times of intervention of the solenoid valve 24 for a quicker decoupling of the intake valve from the respective tappet and causing the quick closing of the intake valve due to the respective return spring, there arises the need of increasing the maximum flow rate of said solenoid valve 24. The sealing diameter D1 ($\approx$D2), associated to the maximum lift allowed to the element 105, defines the passage surface of the fluid between the element 105 and the corresponding seat 104 and thus defines the performance of the solenoid valve in terms of maximum flow rate that can traverse the solenoid valve 24: given that the maximum lift is defined by the electromagnet, it is observed that in order to increase the performance of the solenoid valve, the sole parameter to be operated on is the sealing diameter D1($\approx$D2). On the other hand considering the same value of the maximum pressure flowing in from the inlet openings 102, the increase of the diameter D1($\approx$D2) proportionally leads to the increase of the previously described hydraulic unbalance and thus there would be greater probabilities of the valve malfunctioning.

OBJECT OF THE INVENTION

The object of the present invention is to provide an improved solenoid valve for an engine provided with a system for variable actuation of the intake valves of the type indicated at the beginning of the present invention, which guarantees an accurate, reliable and above all uniform operation of the solenoid valve over the entire operative life of the solenoid valve; furthermore, an object of the invention is also to improve the performance—in terms of flow rate—of the solenoid valve according to the prior art.

Still, another object of the invention is to overcome such problem by means of a solenoid valve having a relatively simple and inexpensive structure.

SUMMARY OF THE INVENTION

In order to attain such object, the present invention aims at providing an engine having the characteristics indicated at the beginning of the present description and further characterised in that:

the body of said valve element is slidably mounted directly within the cylindrical cavity of said valve body, and without the use of sealing rings, and said first and second conical surface portion of the body of the valve element are defined by the axially opposite ends of a circumferential groove formed in a cylindrical outer surface of the body of the valve element, one of said conical surface portions constituting the abovementioned portion of the valve element which cooperates with the valve seat, the other conical surface portion having an outer diameter substantially identical to the diameter of said annular edge defining the valve seat.

The abovementioned characteristics allow obtaining—on one hand—the advantage of eliminating the uncertainty deriving from the variability of the friction force generated by the sealing ring provided for in the known solution and—on the other hand—eliminating the risk of non-closure due to the abovementioned problem of statical indeterminacy of the valve element over the operative life of the solenoid valve. As observed previously, in the case of the known solenoid valve illustrated in FIGS. 2, 4, the valve element is slidably mounted within a separate element (the element 110 of the FIG. 2) fixed in the valve body 101. In the case of the invention, the valve element is slidably mounted directly within the cylindrical cavity of the valve body, hence reducing the possibilities of inaccuracy due to the design tolerance chain of the various elements of the solenoid valve. The elimination of the sealing ring overcomes the previously mentioned drawbacks due to the unpredictability and variability of the friction force generated thereby. The sealing, in the solenoid valve according to the invention can be obtained as a "dynamic" sealing i.e. simply by reducing the clearance present between the valve element and cylindrical cavity of the valve body to a predefined minimum value. Furthermore, the fact that the valve element is slidably mounted directly within the cavity of the valve body and the fact that the two conical surface portions on the outer surface of the valve element are defined by the axially opposite ends of a circumferential groove obtained on the outer surface of the valve element allows providing such conical surface portions simultaneously, through a single machining operation (grinding) and reducing the risk of factory inaccuracies which can lead to a divergence between the axes of the elements that are coupled to each other to the minimum.

Furthermore, in order to overcome the tendency, due to wear, of increasing the sealing diameter defined by the coupling between the valve element and the respective seat (D2), also in the case of the present invention it is possible to provide the sealing seat in a ring made of particularly hard material (which—for such purpose—can be subjected to thermal treatments). However, it should be observed that, with respect to the known art described above, the positioning of said ring in the case of the invention is simplified.

Furthermore, as observable in detail hereinafter, in the case of the invention the possibility of providing the surface of the valve seat simultaneously with the cylindrical surface in which the valve element is slidably mounted, i.e. through the same machining operation, guarantees the circularity of the valve seat and the coaxiality thereof with the cylindrical surface in which the valve element is slidably mounted.

Therefore, in the solution according to the present invention, all possible causes of variation characteristic of the solenoid valve during the operative life thereof are reduced and eliminated. The solenoid valve according to the invention is also simple and inexpensive to construct, and it allows increasing the sealing diameters D1 and D2, i.e. the performance of the solenoid valve.

Considered independently, the previously described solenoid valve also forms an object of the invention.

BRIEF DESCRIPTION OF THE DRAWINGS

Further characteristics and advantages of the present invention will be apparent from the description that follows with reference to the attached drawings, provided purely by way of non-limiting example, wherein.

DESCRIPTION OF SOME PREFERRED EMBODIMENTS

The invention is aimed at providing an internal combustion engine of the type described above, with a MULTIAIR system for the variable actuation of the intake valves of the engine, provided with the solenoid valve having the previously mentioned new characteristics.

The invention also aims at providing such solenoid valve considered independently, in that suitable to be used in the MULTIAIR system for the variable actuation of the intake valves of an internal combustion engine, or in any other system in which the application of a two-way (one inlet and one outlet) solenoid valve and accurate as well as constant operating characteristics over the entire operative life of the solenoid valve can be useful.

Figure 1:
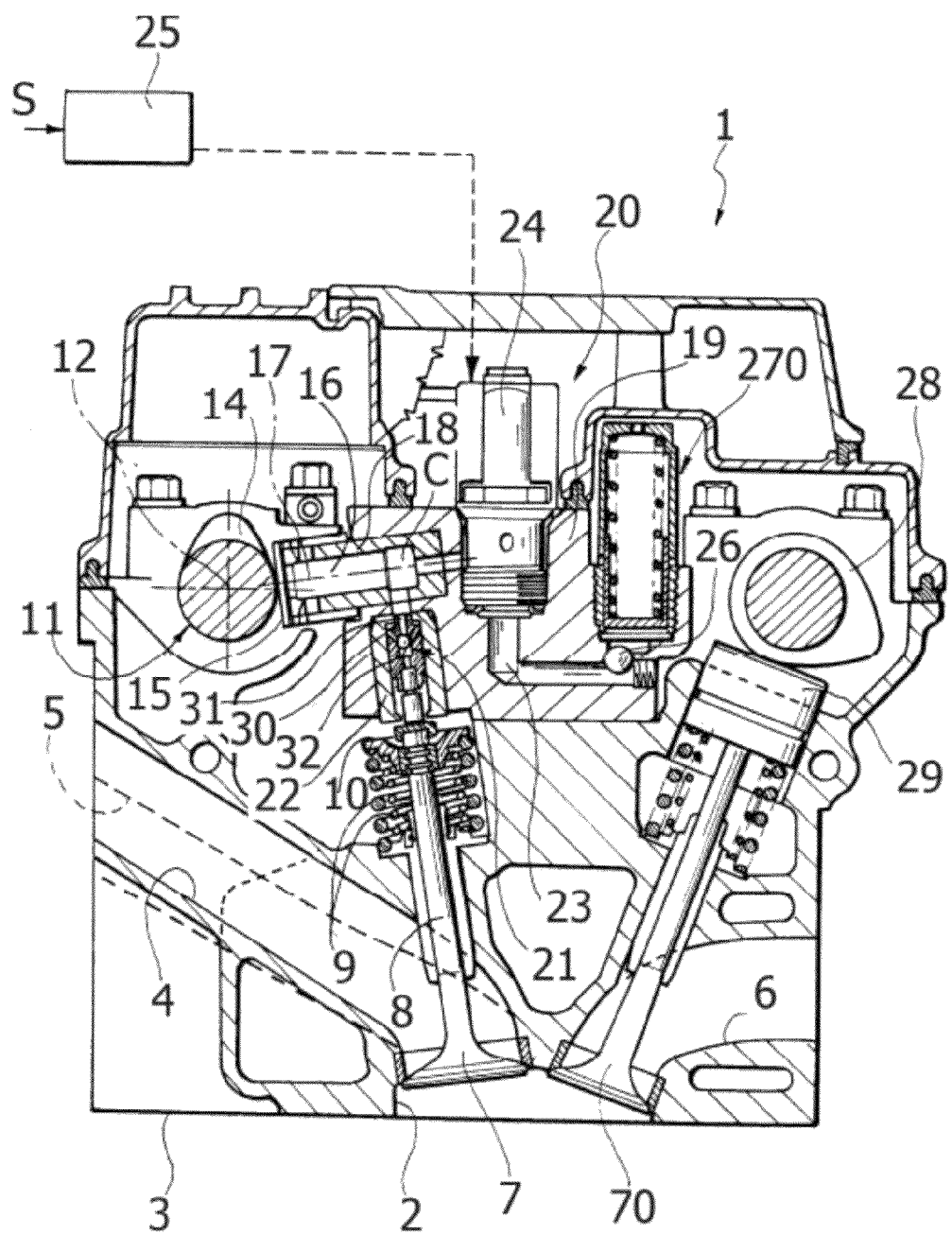
FIG. 1, already described, is a cross-sectional view of an internal combustion engine according to the prior art, of the type for example described in document EP-A-0 803 642 of the applicant, FIG. 2, already described, is a cross-sectional view of a solenoid valve according to the prior art, of the type described in document EP-A-2 017 439 of the applicant, FIG. 3, also already described above, is a schematic representation of the solenoid valve of FIG. 2, FIG. 4, already described above, is an enlarged scale view of a detail of the solenoid valve of the FIG. 2, according to a concrete embodiment also part of the prior art, FIG. 4A, also already described above, illustrates an enlarged scale detail of FIG. 4.
Figure 2:
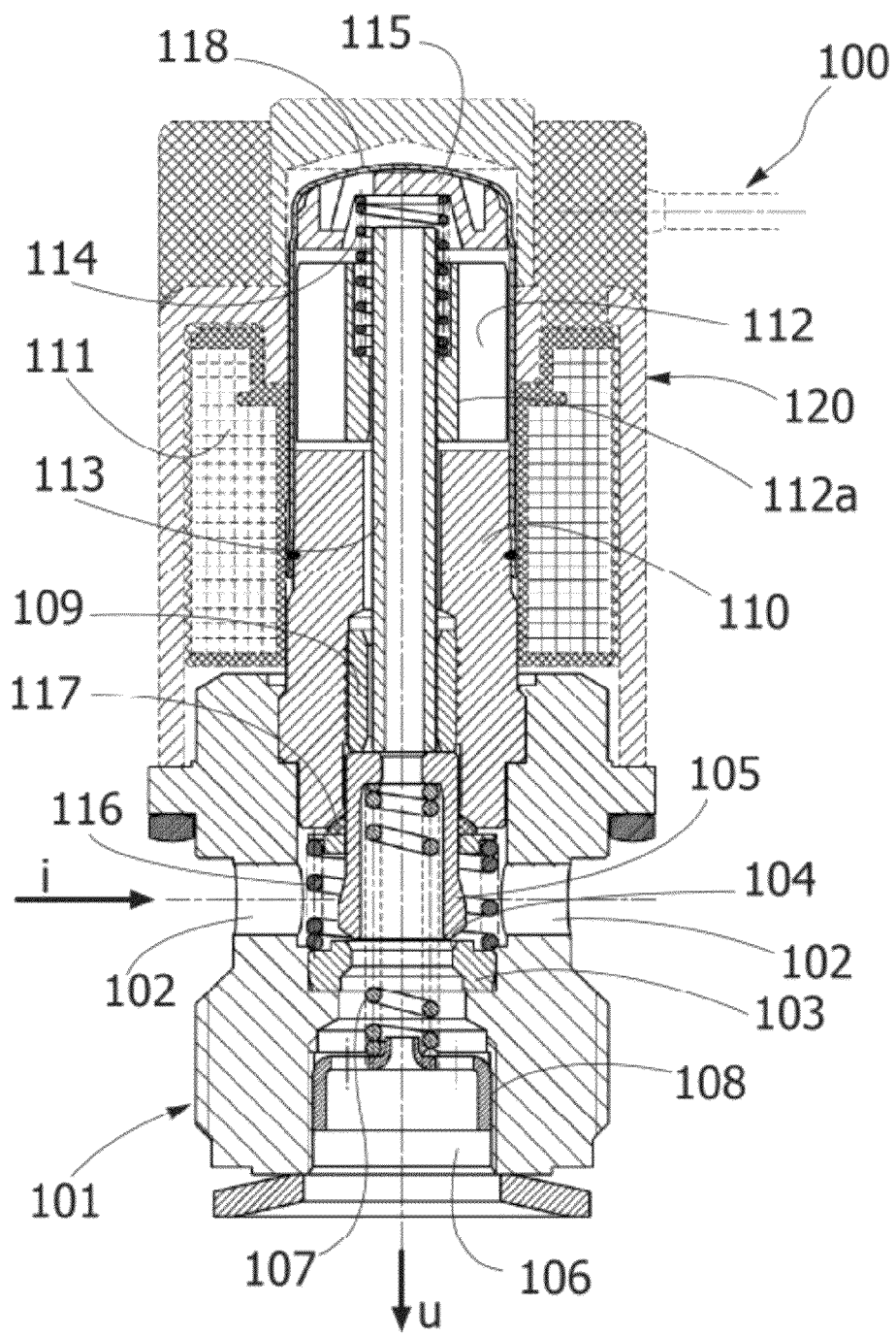
Figure 3:
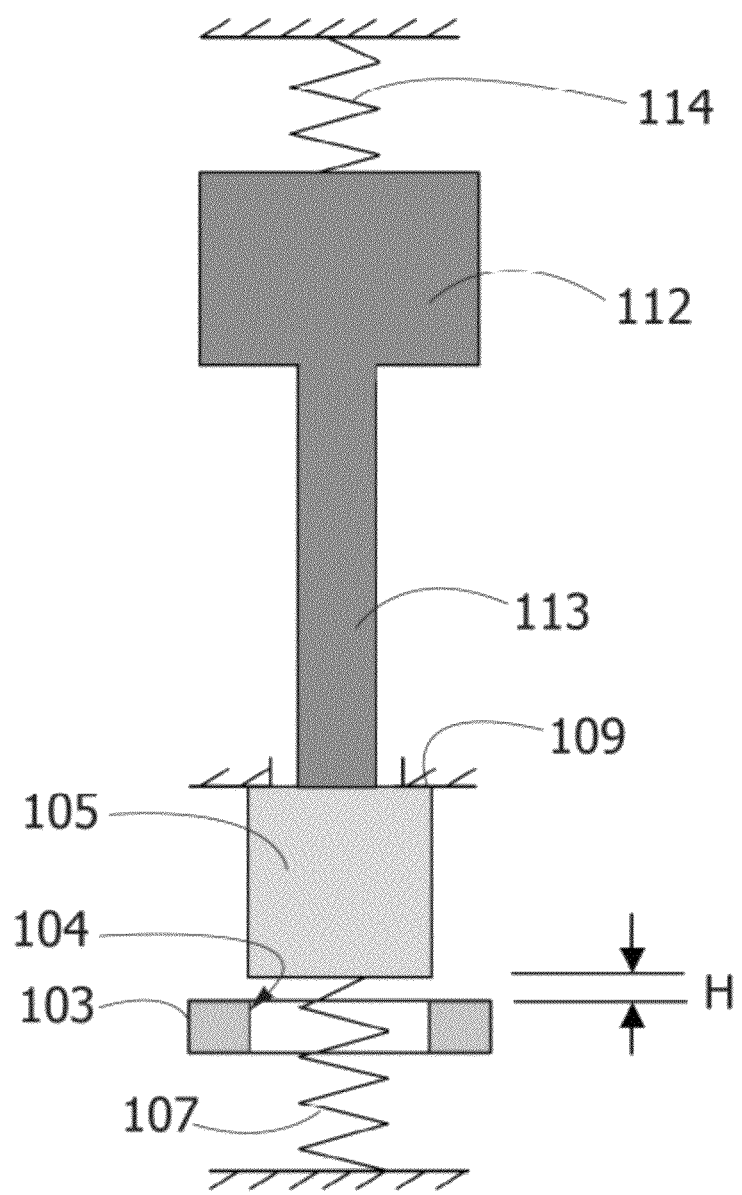
Figure 4:
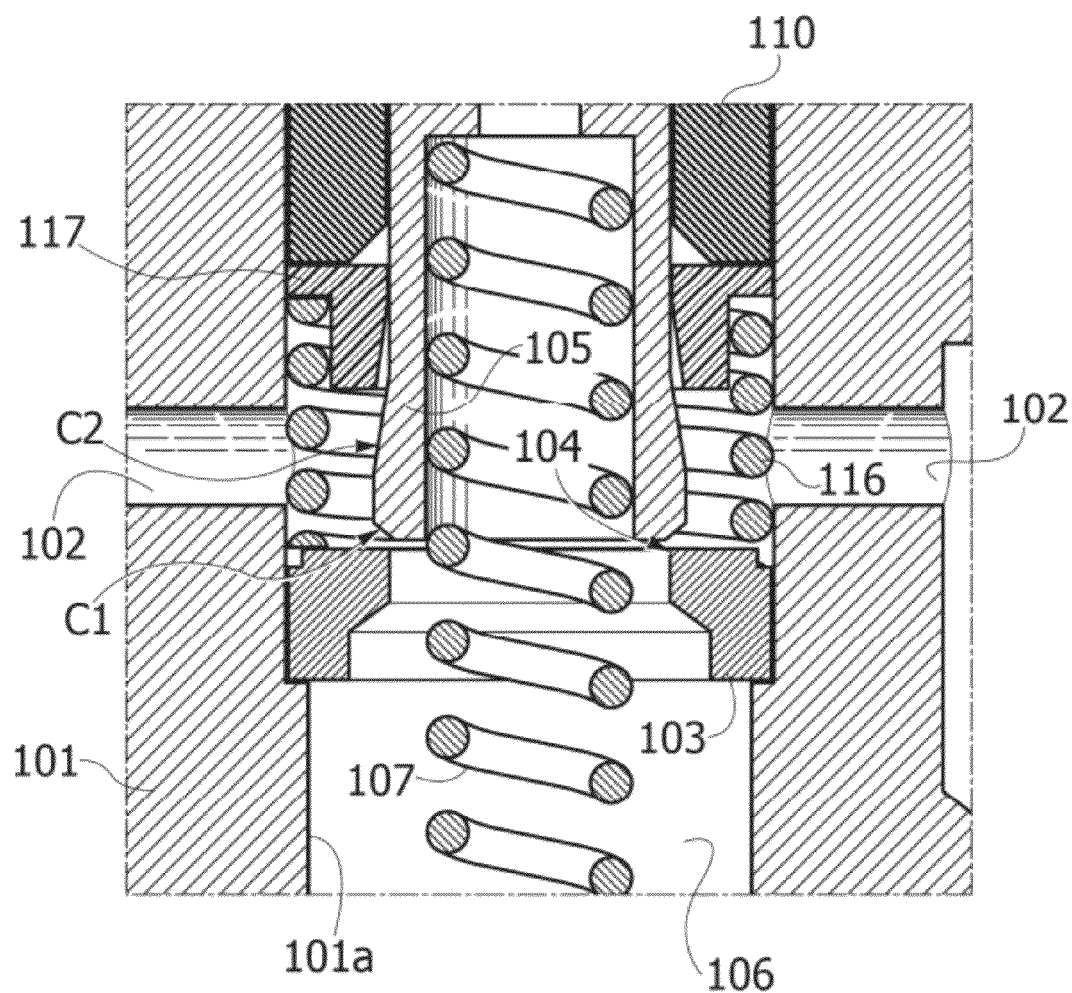
Figure 4A:
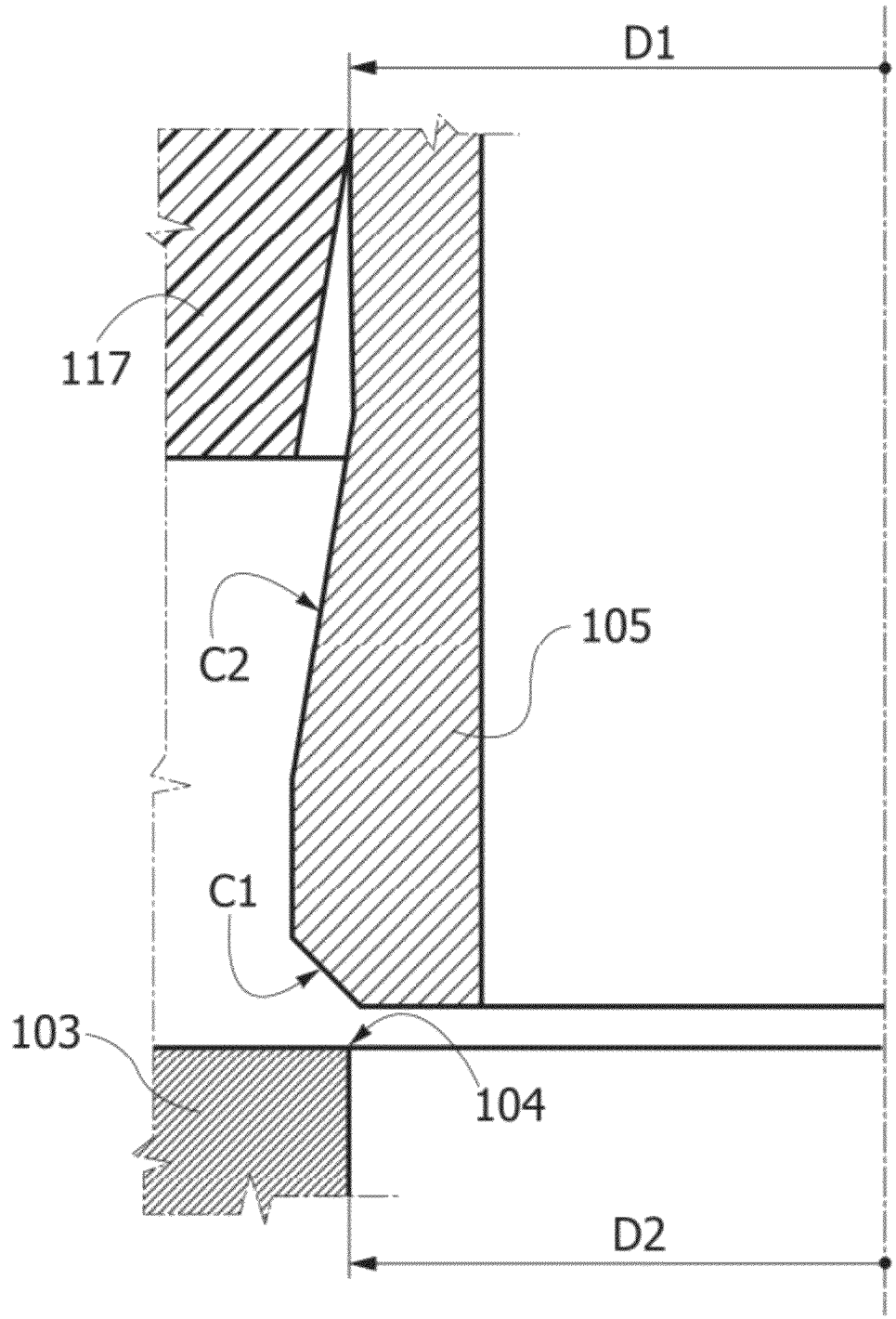
Figure 5:
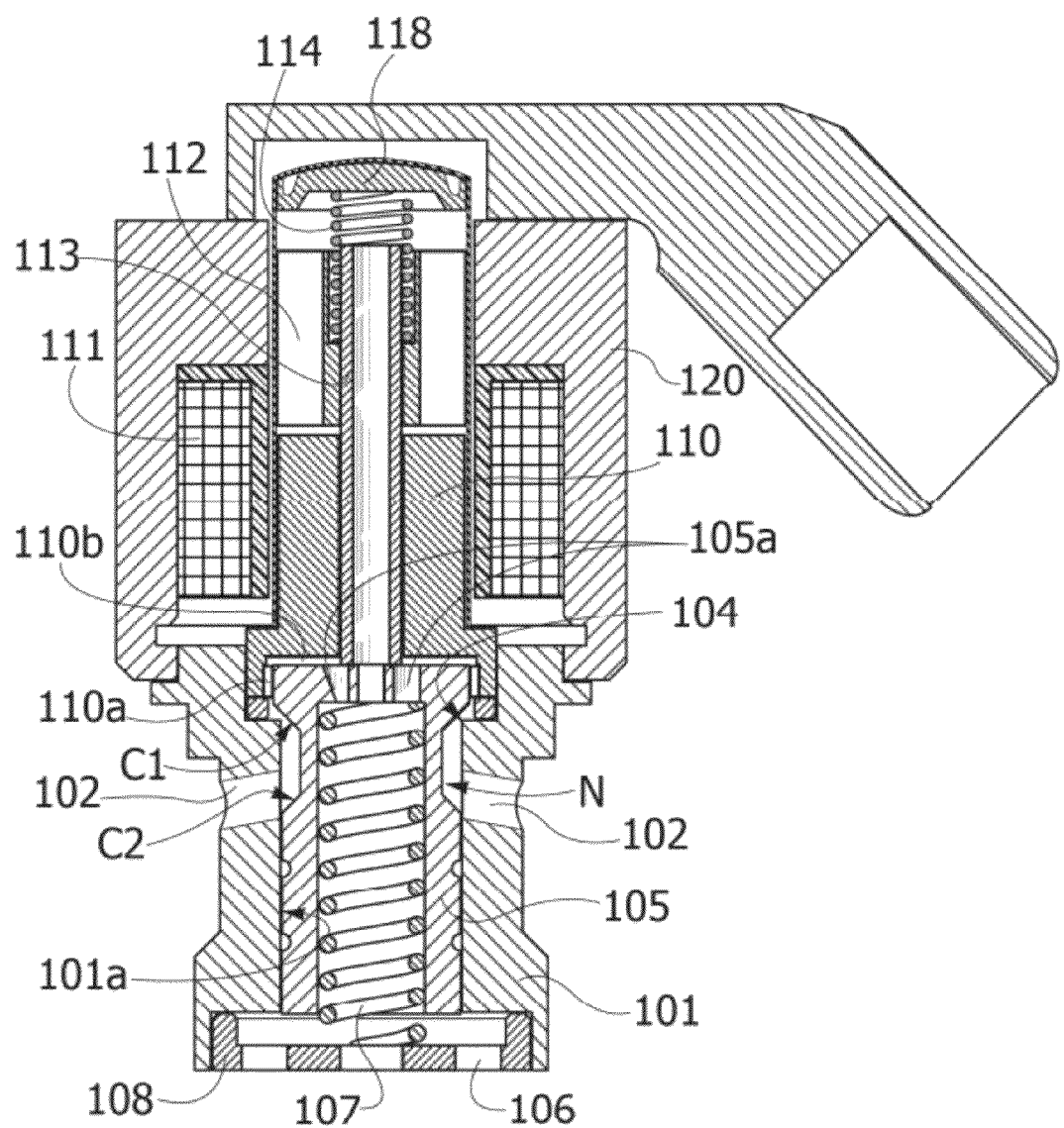
FIG. 5 illustrates a first embodiment of the solenoid valve according to the invention, of the normally open type.
Figure 6:
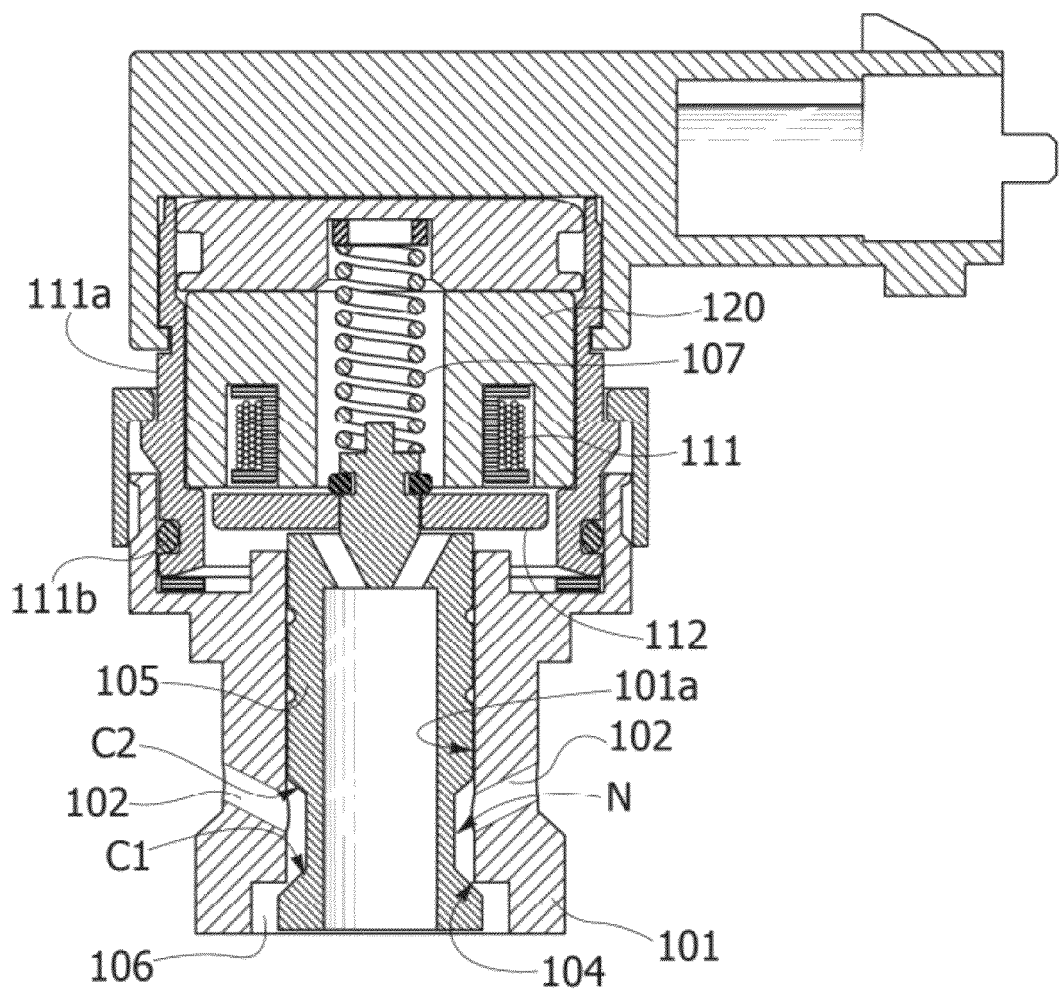
FIG. 6 illustrates a second embodiment of the solenoid valve according to the invention, also of the normally open type.
Figure 7:
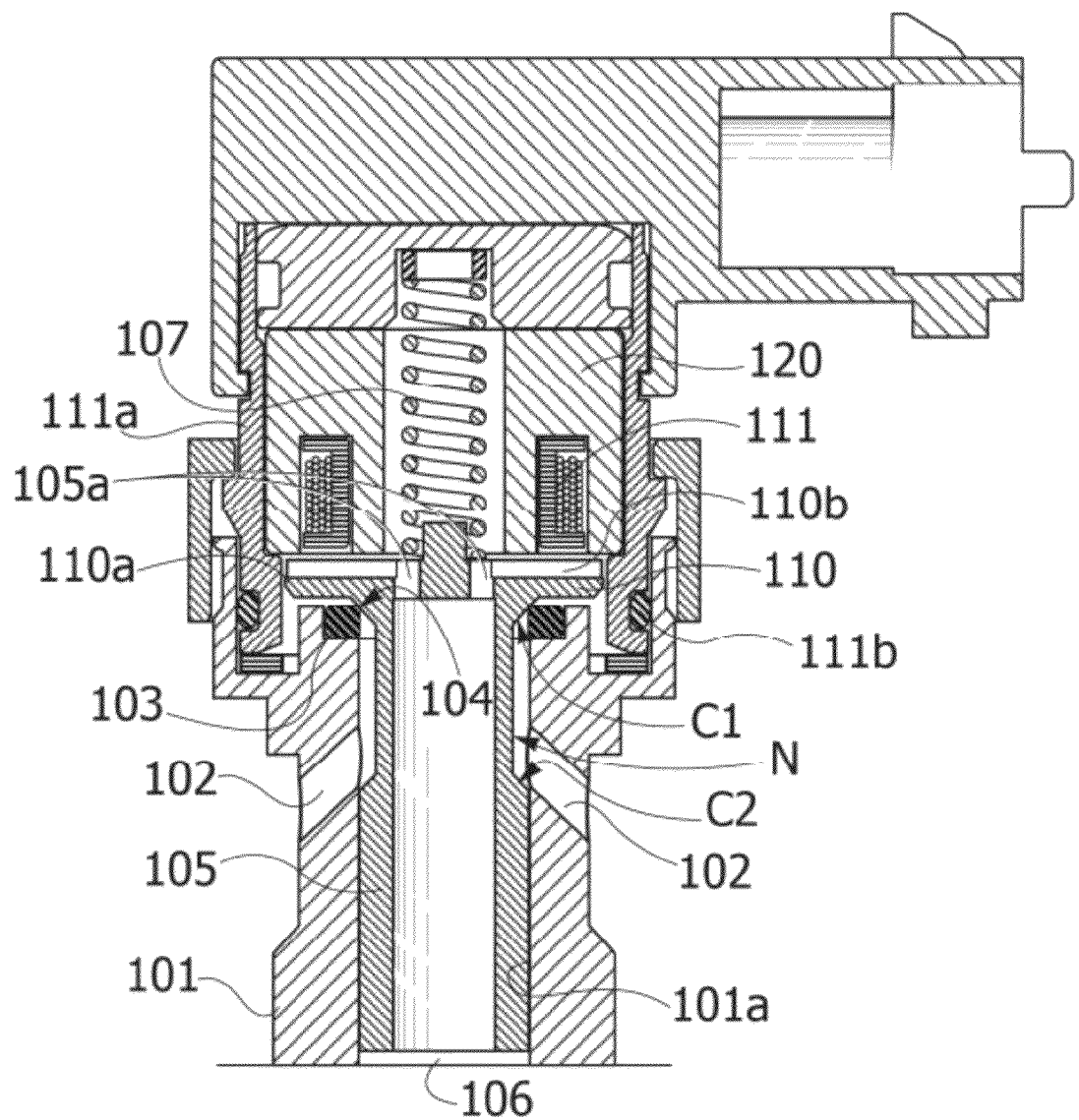
FIG. 7 illustrates a further embodiment of the solenoid valve according to the invention, of the normally closed type.

FIGS. 1-4 of the attached drawings were already described previously. In FIGS. 5-7, the parts corresponding to those of FIGS. 2-4 are indicated using the same reference number.

FIG. 5 shows a first embodiment of a solenoid valve according to the present invention. With reference to such figure, a first considerable difference with respect to the known solution described above lies in the fact that the body of the valve element 105 is slidably mounted directly within the cylindrical cavity 101a of the valve, without the interposition of an element mounted within such cavity, like the element 110 of the FIG. 2.

A second considerable difference with respect to the known solution illustrated in FIG. 2 lies in the fact that the body of the valve element 105 is slidably mounted within the cavity 101a without the provision of any sealing ring of the type of the ring 117 of FIGS. 2 and 4. The elimination of the sealing ring is enabled by the fact that the dynamic sealing is applied, i.e. the clearance between the valve element 105 and cylindrical cavity 101a of the valve body is reduced to the minimum.

A further considerable difference of the solenoid valve of the invention with respect to the known solution of FIG. 2 lies in the fact that in this case the two conical surface portions C1, C2 of the body of the valve element 105 are defined by the opposite ends of a circumferential groove N formed on a cylindrical outer surface of the body 105. In the case of the solution of FIG. 5, the upper conical surface portion C1 cooperates with the valve seat 104 defined in a position adjacent to the cylindrical cavity 101a and provided within the body 101.

Also in the case of FIG. 5 the spring 107 maintains the valve element 105 at an open position, in which the conical surface portion C1 is spaced from the valve seat 104. When the solenoid 111 is enabled, the moveable anchor 112 is moved downwards with respect to the element 110 and thus moves the stem 113 to push the valve element 105 towards the closed position thereof, in which the conical surface portion C1 is at contact with the valve seat 104.

As observable, both the conical surface portions C1, C2 are exposed to the fluid pressure communicated by the inlet openings 102, hence if the outer diameter of the conical surface portion C2 is identical to the diameter of the annular edge defining the valve seat 104, the valve element 105 is perfectly balanced and the solenoid is solely required to overcome the total force of the springs 107, 118 (between a minimum friction component present between the cylindrical surfaces which define the dynamic sealing of the elements 105 and 101a: contrary to what occurs regarding the elastic ring 117 of the solution of FIG. 2, in this case the friction component is lesser and stable over the life of the valve).

Due to the previously described configuration of the valve element 105, the conical surface portions C1, C2 can be obtained by means of a single machining operation, through which the circumferential groove N is formed. This ensures easily guaranteeing machining precision in order to guarantee the balanced condition of valve element.

With reference to FIG. 5, when the valve element is in the open position thereof (illustrated in the figure), the pressurized fluid coming from the inlet openings 102 reaches the outlet opening 106 passing through the chamber defined by the circumferential groove N, through passages 110a, 110b obtained on the end surface of the element 110 and through openings 105a obtained at the upper end of the valve element 105 and ending up in the inner cylindrical cavity of the body of the valve element 105, which in turn ends up at the lower end thereof in the outlet opening 106 of the solenoid valve.

As described above, the specific configuration and structure of the solenoid valve of FIG. 5 allows guaranteeing the perfect closing and sealing condition of the moveable element 105 with respect to the seat 104. The elimination of the sealing ring made of plastic material overcomes the drawback related to the friction force generated by such sealing ring over the valve element and above all the unpredictability of the variation of such friction force over time, due to wear; the elimination of the sealing ring also eliminates the risk of the increase of the leakages to the advantage of stability and robustness of operation of the solenoid valve.

Therefore, in the solenoid valve according to the invention the operating uniformity of the solenoid valve is guaranteed over the entire duration of the operative life thereof, this being an essential characteristic in the engine according to the invention with the aim of controlling the opening and closing instants of the intake valves of the engine in an accurate and predefined manner.

FIG. 6 illustrates a second embodiment of the solenoid valve according to the invention wherein the valve element 105 is directly connected to a moveable anchor 112 in form of a disc, facing—at the front part—an end of the solenoid 111. The solenoid 111 is carried by an annular body mounted within a cylindrical casing 111a fixed in a widened end of the valve body 101 with the interposition of a sealing ring 111b. In this case, given that the valve element 105 is directly connected to the moveable anchor 112, the thrust element 113 is not provided for and hence also the spring 118 associated thereto is eliminated. The spring 107 which in this case is housed within the cavity of the body carrying the solenoid 111 and which tends to move the valve element 105 downwards (with reference to FIG. 6) is provided for instead. Therefore, in this case, the conical surface portion C1 which cooperates with the valve seat 104 is the one formed at the lower end (with reference to the drawings) of the circumferential groove N. Actually, the solenoid valve is usually open as observable in FIG. 6, the open condition of the solenoid valve occurs when the solenoid is de-excited: the conical surface portion C1 is spaced from the valve seat 104 and the inlet openings 102 are in direct communication with the outlet openings 106 formed by the lower end of the inner cylindrical cavity 101a of the valve body 101.

In the known solution of FIG. 2, the electromagnet is a dry environment, i.e. insulated from the fluid: this has a cost and also leads to a lower efficiency of the windings of the solenoid 111, in that between the moveable anchor 112 and the core 120 there is necessarily provided for a radial clearance which leads to the loss of efficiency of the solenoid. In the solution of FIG. 6 instead the non-magnetic gap is only that corresponding to the axial distance between the moveable anchor 112 and the end surface of the solenoid 111 opposite thereto, hence enabling exploiting the magnetic field generated by the solenoid more efficiently.

The embodiment of FIG. 7 is similar to that of FIG. 6 as regards with the provision of a valve element 105 directly connected to the moveable anchor 112, such moveable anchor 112 being in form of a disc facing the lower end surface of the solenoid 111 and of the core 120. The difference with respect to the solution of FIG. 6 lies in the fact that the solenoid valve of the FIG. 7 is of the normally closed type.

In this case, the valve seat 104 is obtained in a ring 103 which is positioned within the body 101: the object of inserting the ring consists in the possibility of differentiating the material of the valve seat 104 from the material of the tubular body 101. This solution allows optimizing the material of the tubular body 101 depending on the electromagnetic properties (the tubular body 101 is part of the magnetic circuit) while it allows optimizing the material of the ring 103 thus selecting material that is particularly hard and resistant to wear, given that it comes to contact with the element 105 (actually materials with good ferromagnetic properties usually reveal poor resistance to wear).

After force-fitting the ring 103 into the body 101, the ring 103 and tubular body 101 assembly can be ground in order to guarantee the coaxiality of the seat valve 104 defined by the ring 103 with the cylindrical surface 101a (i.e. in order to provide for that D1≈D2).

The positioning of the surface 104 in a ring made of hard material 103 which is machined simultaneously with the valve body 101 therefore guarantees the dynamic balance and the coincidence of the diameters D1≈D2.

Therefore, the conical surface portion C1 which cooperates with the valve seat 104 defined by the ring 103 is the one formed at the upper end of the circumferential groove N. Hence, the spring 107 usually maintains the conical surface portion C1 against the valve seat 104, while an excitation of the solenoid 111 causes the lifting (with reference to the drawing) of the moveable anchor 112 and the opening of the solenoid valve. In such open condition, the pressurised fluid coming from the inlet openings 102 reaches the outlet opening 106 passing into the circumferential chamber defined by the groove N and in passages 110a, 110b formed around and above the moveable element 105 and axial passages 105a formed at the upper end of the valve element 105.

Also in the case of the embodiments of FIGS. 6, 7 the advantages of higher guarantee to obtain a hydraulically balanced valve element and whose operation is not subject to variations during the life of the solenoid valve are maintained.

Obviously, without prejudice to the principle of the invention, the construction details and embodiments may vary widely with respect to what has been described and illustrated, without departing from the scope of protection of the present invention, in particular the seat 104 obtained in the ring 103 can also be applied to the diagrams shown in FIGS. 5 and 6.

Furthermore what has been mentioned also applies even though the surface of the element 105 which ends up engaged with the valve seat 104 has a spherical-shaped cap while the valve seat 104 is frusto-conical shaped.

What is claimed is:

1. Internal combustion engine, comprising:
   a combustion chamber,
   at least one intake conduit and at least one exhaust conduit ending up in said combustion chamber,
   an intake valve and an exhaust valve associated to said intake conduit and said exhaust conduit and each provided with respective return springs which push the valve towards a closed position,
   a camshaft for actuating the intake valves, through respective tappets,
   wherein each intake valve is controlled by the respective tappet against the action of the abovementioned return spring by hydraulic means including a pressurized fluid chamber on which there is faced a pumping piston connected to the tappet of the valve,
   a solenoid valve controllable between a closed condition and an open condition, wherein said solenoid valve places said pressurized fluid chamber in communication with an exhaust channel for decoupling the intake valve from the respective tappet and causing the quick closing of the intake valve due to the respective return spring,
   electronic control means, for controlling said solenoid valve to vary the opening instant and/or the closing instant and/or the lift of the intake valve as a function of one or more engine operative parameters,
   wherein said solenoid valve comprises:
   a valve body with a cylindrical inner cavity, at least one inlet opening communicating with said pressurized fluid chamber, formed radially through said body and ending up on said cylindrical cavity, and at least one outlet opening defined by an end of said cylindrical cavity which ends up on an end surface of the valve body,
   a valve seat, formed on said valve body or on an annular element fixed in said valve body, said valve seat being defined by a concentric annular edge with said cylindrical cavity,
   a valve element having a valve element body with an outer surface having a first surface portion and a second surface portion, said first surface portion and said second surface portion being substantially conical and having opposite conicities, said valve element body being cylindrical and slidably mounted within said cylindrical cavity of the valve body between a first position wherein said first surface portion is in contact with said valve seat, so as to prevent a communication between said inlet opening and said outlet opening, and a second position wherein said first surface portion is spaced from said valve seat, so as to establish the communication between said inlet opening and said outlet opening, said second portion having an outer diameter substantially identical to a diameter of said annular edge defining the valve seat, spring means for returning the valve element towards one of said first and second position, and an electromagnet which can be activated to move the valve element towards the other position, said electromagnet comprising a solenoid mounted on the valve body and a moveable anchor controlled by the solenoid and associated to the valve element, said first surface portion and said second surface portion of said valve element exposed to a pressure communicated by said inlet opening, whereby the valve element is hydraulically balanced, so as to be solely subject to the action of said solenoid and said elastic means, said valve element body slidably mounted directly within the cylindrical cavity of said valve body, without the use of sealing rings, and said first surface portion and second surface portion of said valve element body defining axially opposite ends of a circumferential groove bounded by said first surface portion, said second surface portion, and a connecting portion of a cylindrical outer surface of said valve element body connecting said first surface portion and said second surface portion, said groove comprising a recess in said valve element body recessed relative to an outermost surface of said valve element body in a direction radially inwardly relative to said cylindrical cavity of the valve body.

2. Engine according to claim 1, wherein said spring means push the valve element towards the normally open position thereof.

3. Engine according to claim 2, wherein the moveable anchor of said electromagnet is provided with a thrust element, separate from the valve element for pushing the valve element towards the closed position thereof, against the action of said spring means.

4. Engine according to claim 2, wherein said valve element is rigidly connected to said moveable anchor and said moveable anchor is in form of a disc facing—at the front part—an end of said solenoid.

5. Engine according to claim 1, wherein said spring means push the valve element towards the closed position thereof, said valve element rigidly connected to said moveable anchor and said moveable anchor is in form of a disc facing—at the front part—an end of said solenoid.

6. Engine according to claim 1, wherein said valve seat is obtained in a ring, rigidly connected with the valve body, said ring being made of hard material and said body being made of high magnetic permeability material.

7. Engine according to claim 6, wherein said ring is rigidly connected with the valve body through force-fitting or through welding, and the ring and valve body assembly is simultaneously ground to guarantee the coaxiality between the valve seat and the inner surface of the valve body within which the valve element is slidably mounted.

8. Solenoid valve comprising:
a valve body with a cylindrical inner cavity, at least one inlet opening formed radially through said body and ending up on said cylindrical cavity, and at least one outlet opening defined by an end of said cylindrical cavity which ends up on an end surface of the valve body, a valve seat, formed on said valve body or on an annular element fixed in said valve body, said valve seat being defined by a concentric annular edge with said cylindrical cavity, a valve element having a valve element body with an outer surface having a first surface portion and a second surface portion, said first surface portion and said second surface portion being substantially conical and having opposite conicities, said valve element body being cylindrical and slidably mounted within said cylindrical cavity of the valve body between a first position wherein said first portion is in contact with said valve seat, so as to prevent the communication between said inlet opening and said outlet opening, and a second position wherein said first surface portion is spaced from said valve seat, so as to establish a communication between said inlet opening and said outlet opening, said second portion having an outer diameter substantially identical to a diameter of said annular edge defining the valve seat, spring means for returning the valve element towards one of said first position and said second position, and an electromagnet which can be activated to move the valve element towards the other position, said electromagnet comprising a solenoid mounted on the valve body and a moveable anchor controlled by the solenoid and associated to the valve element, said first portion and said second portion of said valve element exposed to a pressure communicated by said inlet opening, whereby the valve element is hydraulically balanced, so as to be solely subject to the action of said solenoid and said elastic means, said valve element body slidably mounted directly within the cylindrical cavity of said valve body, and without the use of sealing rings, and said first surface portion and second surface portion of the said valve element body defining axially opposite ends of a circumferential groove bounded by said first surface portion, said second surface portion, and a connecting portion of a cylindrical outer surface said valve element body connecting said first surface portion and said second surface portion, said groove comprising a recess in said valve element body recessed relative to an outermost surface of said valve element body in a direction radially inwardly relative to said cylindrical cavity of the valve body.

9. Solenoid valve according to claim 8, wherein said spring means push the valve element towards the normally open position thereof.

10. Solenoid valve according to claim 9, wherein the moveable anchor of said electromagnet is provided with a thrust element, separate from the valve element for pushing the valve element towards the closed position thereof, against the action of said spring means.

11. Solenoid valve according to claim 9, wherein said valve element is rigidly connected to said moveable anchor and in that said moveable anchor is in form of a disc facing, at the front part, an end of said solenoid.

12. Solenoid valve according to claim 8, wherein said spring means push the valve element towards the closed position thereof and in that said valve element is rigidly connected to said moveable anchor and that said moveable anchor is in form of a disc facing, at the front part, an end of said solenoid.

13. Solenoid valve according to claim 8, wherein said valve seat is obtained in a ring, rigidly connected with the valve body, said ring being made of hard material and said valve body being made of high magnetic permeability material.

14. Solenoid valve according to claim 13, wherein said ring is rigidly connected with the valve body through force-fitting or through welding, and the ring and valve body assembly are simultaneously ground to guarantee the coaxiality between the valve seat and the inner surface of the valve body within which the valve element is slidable.

* * * * *